(12) United States Patent
Kipnis et al.

(10) Patent No.: US 7,013,293 B1
(45) Date of Patent: Mar. 14, 2006

(54) PORTABLE TRANSACTION DEVICE

(75) Inventors: Shlomo Kipnis, Jerusalem (IL);
Yonatan Silver, Jerusalem (IL)

(73) Assignee: NDS Limited, Middlesex (GB)

( * ) Notice: Subject to any disclaimer, the term of this patent is extended or adjusted under 35 U.S.C. 154(b) by 0 days.

(21) Appl. No.: 09/490,540

(22) Filed: Jan. 25, 2000

(51) Int. Cl.
*G06F 17/60* (2006.01)

(52) U.S. Cl. .......................................... 705/43; 705/40

(58) Field of Classification Search ............ 705/25–44; 235/377–382.5
See application file for complete search history.

(56) References Cited

U.S. PATENT DOCUMENTS

| | | | |
|---|---|---|---|
| 5,468,941 A | 11/1995 | Sasaki | |
| 5,511,121 A | 4/1996 | Yacobi | |
| 5,515,031 A | 5/1996 | Pereira et al. | |
| 5,561,709 A * | 10/1996 | Remillard | 379/93.19 |
| 5,566,327 A * | 10/1996 | Sehr | 705/43 |
| 5,585,787 A | 12/1996 | Wallerstein | |
| 5,590,038 A | 12/1996 | Pitroda | |
| 5,602,919 A | 2/1997 | Hurta et al. | |
| 5,648,647 A | 7/1997 | Seiler | |
| 5,715,926 A | 2/1998 | Furneaux | |
| 5,748,740 A | 5/1998 | Curry et al. | |
| 5,914,472 A * | 6/1999 | Foladare et al. | 235/380 |
| 6,085,976 A * | 7/2000 | Sehr | 705/43 |
| 6,173,269 B1 | 1/2001 | Solokl et al. | |
| 6,325,292 B1 * | 12/2001 | Sehr | 235/492 |
| 6,386,451 B1 * | 5/2002 | Sehr | 705/43 |
| 6,442,532 B1 * | 8/2002 | Kawan | 705/43 |
| 6,529,725 B1 * | 3/2003 | Joao et al. | 455/406 |

FOREIGN PATENT DOCUMENTS

| | | |
|---|---|---|
| WO | WO 98/27519 | 6/1998 |
| WO | WO 98/47116 | * 10/1998 |

OTHER PUBLICATIONS

Caskey et al., "Is the debit card revolution finally here?", Economic Review (Federal Reserve Banbk of Kansas City) v79n4 P:79-95, Fourth Quarter 1994, IAAN: 0161-2387, Dialog file 15, Accession No. 00955753.*
www.mondex.com (Mondex Technologies, web page).
www.modexusa.com (Welcome to Mondex USA, web pages, pp. 1-4).
Schneier, Bruce, *Applied Cryptography*, 2nd Edition, John Wiley & Sons, Inc., 1996, pp. 30-31, 428-459.
Oxford Micro Devices, Inc., "Fingerprint Technology for Childproof Handguns, Smart Guns, High Tech. Trigger Locks, Safer Guns and Personalized Guns", Aug. 1999, pp. 1-3.

* cited by examiner

*Primary Examiner*—Frantzy Poinvil
(74) *Attorney, Agent, or Firm*—Welsh & Katz, Ltd.

(57) ABSTRACT

A portable transaction device including transaction apparatus operative to participate in a monetary transaction, authorization apparatus operative to authorize the transaction apparatus to operate based on stored authorization parameters, and control apparatus operative to store the stored authorization parameters based on user input. The stored authorization parameters include at least one of the following: an identity of a user, a time period, and a distance. Related apparatus and methods are also provided.

15 Claims, 5 Drawing Sheets

US 7,013,293 B1

PORTABLE TRANSACTION DEVICE

FIELD OF THE INVENTION

The present invention relates to portable devices in general, and in particular to portable devices, such as devices used in carrying out a transaction, including a processor and storage.

BACKGROUND OF THE INVENTION

Portable devices that include a processor and storage are well known in the art. One example of such devices is the IC card or smart card, but many other portable devices including a processor and storage are well known.

Some portable devices are useable in ways which are particularly valuable. An example of a particularly valuable use is a use in monetary transactions; for example, certain types of smart cards may be used to authorize a monetary transaction or may be used to store monetary value that is useable in a monetary transaction. One example of a stored value smart card is the Mondex card, which is described, for example, in one or both of the following World Wide Web (WWW) sites: www.mondex.com; and www.mondexusa.com.

Another example of a particularly valuable use is a use in a service related transaction; for example, in a card such as a smart card which provides conditional access services.

For purposes of simplicity of description, the term "monetary transaction" is used throughout the present specification and claims to include both monetary transactions and service related transactions.

It is known in the art to provide conditional access or user authorization to portable devices which are particularly valuable.

U.S. Pat. No. 5,515,031 to Pereira et al describes a credit card detector and validator which detects non-return of a credit card to a user, or return of an incorrect credit card to a user.

PCT published patent application WO 98/27519 describes an improvement to credit cards, in which a verification device separate from the credit card is used. Data is read from the verification device at the time that a transaction is carried out, ensuring that the verification device is related to the credit card.

U.S. Pat. No. 5,648,647 to Seiler describes an anti-fraud credit card dispatch system in which a time sequence at a point of sale verifies possession of both an old credit card and a new, replacement credit card.

U.S. Pat. No. 5,585,787 to Wallerstein describes a programmable credit card which allows access to one of a plurality of different credit accounts.

U.S. Pat. No. 5,590,038 to Pitroda describes a universal electronic transaction card which may serve as a number of different credit cards, identification cards, or other cards.

U.S. Pat. No. 5,748,740 to Curry et al describes a module used for secure transactions, the module being capable of being programmed, keeping track of real time, recording transactions for later review, and creating encryption key pairs.

U.S. Pat. No. 5,468,941 to Sasaki describes money processing apparatus including, in addition to money feeding a storing, data and time apparatus.

U.S. Pat. No. 5,511,121 to Yacobi describes an electronic cash system which takes advantage of a property of the El Gamal signature scheme.

U.S. Pat. No. 5,602,919 to Hurta et al describes a system for monetary transactions including a smart card and a smart-card-based transponder.

U.S. Pat. No. 5,715,926 to Furneaux et al describes apparatus for validating items of value, such as money.

Hash functions and other cryptographic functions that may be useful in the field of providing conditional access to monetary transactions are described in: Bruce Schneier, *Applied Cryptography, Second Edition*, John Wiley & Sons, Inc., 1996.

The disclosures of all references mentioned above and throughout the present specification are hereby incorporated herein by reference.

SUMMARY OF THE INVENTION

The present invention seeks to provide an improved portable device, preferably including authorization apparatus to authorize use of the device. The portable device may comprise a portable transaction device, such as a portable transaction device for participating in a transaction such as a monetary transaction. Alternatively, the portable device may comprise a device, such as a control unit or a remote control unit to which it is desired to apply authorization control.

There is thus provided in accordance with a preferred embodiment of the present invention a portable transaction device including transaction apparatus operative to participate in a monetary transaction, authorization apparatus operative to authorize the transaction apparatus to operate based on stored authorization parameters, the stored authorization parameters including at least one of the following: an identity of a user, a time period, and a distance, and control apparatus operative to store the stored authorization parameters based on user input.

Further in accordance with a preferred embodiment of the present invention the portable transaction device also includes authentication apparatus including storage apparatus operative to store an identity of at least one authentic authorization control user, and user determination apparatus operative to determine whether a user of the portable transaction device is an authentic authorization control user, based, at least in part, on the identity of at least one authorization control user stored in the storage apparatus, and the control apparatus is operative to store the stored authorization parameters based on a determination by the authentication apparatus that the user is an authentic authorization control user.

Still further in accordance with a preferred embodiment of the present invention the user determination apparatus includes an input device operative to receive a user-identifying input.

Additionally in accordance with a preferred embodiment of the present invention the input device includes a password input device operative to receive a supplied password.

Moreover in accordance with a preferred embodiment of the present invention the input device includes a keypad.

Further in accordance with a preferred embodiment of the present invention the input device includes a voice recognition input device.

Still further in accordance with a preferred embodiment of the present invention the input device includes a biometric input device.

Additionally in accordance with a preferred embodiment of the present invention the biometric input device includes a fingerprint input device.

Moreover in accordance with a preferred embodiment of the present invention the authentication apparatus also includes authorization identity receiving apparatus operative to receive a signal indicating that a new user is to be considered an authentic authorization control user and to store an identity of the new authorization control user in the storage apparatus.

Further in accordance with a preferred embodiment of the present invention the storage control apparatus has a maximum storage capacity sufficient to store an identity of at most one authentic authorization control user.

Still further in accordance with a preferred embodiment of the present invention the storage control apparatus is operative to store an identity of at most one authentic authorization control user, and the authentication apparatus also includes authorization identity receiving apparatus operative to receive a signal indicating that a new user is to be considered an authentic authorization control user and to store an identity of the new authorization control user in the storage apparatus.

Additionally in accordance with a preferred embodiment of the present invention the time period includes a time period during which a user is authorized to use the portable transaction device.

Moreover in accordance with a preferred embodiment of the present invention the identity of a user includes an identity of a user who is authorized to use the portable transaction device.

Further in accordance with a preferred embodiment of the present invention the portable transaction device also includes proximity determination apparatus operative to determine a distance between the portable transaction device and a predetermined location, and the distance includes a maximum distance from the predetermined location at which the portable transaction device is authorized to be used.

There is also provided in accordance with another preferred embodiment of the present invention a portable element including authorization apparatus operative to authorize use of the portable element in accordance with at least one of the following authorization parameters: at least one defined period of time, a defined distance from a specified location, at least one defined type of transaction, at least one type of transaction meeting a predefined criterion, and at least one authorized person authorized to use the portable element.

Further in accordance with a preferred embodiment of the present invention the authorization apparatus is operative to authorize use of the portable element in accordance with a predefined function of at least two of the authorization parameters.

Still further in accordance with a preferred embodiment of the present invention the authorization apparatus is operative to authorize use of the portable element up to a quantitative use limit, and the use limit is a function of at least one of the following: an elapsed time since a predetermined time, a fixed time, a distance from a specified location, a type of transaction, and an identity of an authorized person authorized to use the portable element.

Additionally in accordance with a preferred embodiment of the present invention the at least one authorized person includes a plurality of authorized persons each associated with an authorization profile, and the authorization apparatus is operative to authorize use of the portable element by each of the plurality of authorized persons in accordance with the authorization profile.

Moreover in accordance with a preferred embodiment of the present invention the at least one authorized person includes exactly one authorized person associated with an authorization profile, and the authorization apparatus is operative to authorize use of the portable element by the one authorized person in accordance with the authorization profile.

Further in accordance with a preferred embodiment of the present invention the portable element includes a control device for controlling electronic equipment.

Still further in accordance with a preferred embodiment of the present invention the control device includes a television remote control device.

Additionally in accordance with a preferred embodiment of the present invention the predetermined criterion includes a predetermined transaction limit.

Moreover in accordance with a preferred embodiment of the present invention the predetermined transaction limit includes a predetermined monetary limit.

Further in accordance with a preferred embodiment of the present invention the authorization parameters are based, at least in part, on authorization parameter defining information, and also including authorization input apparatus operative to receive the authorization parameter defining information.

Still further in accordance with a preferred embodiment of the present invention the authorization input apparatus includes input authentication apparatus operative to authenticate the received authorization parameter defining information and to reject non-authentic received information.

There is also provided in accordance with another preferred embodiment of the present invention a method for use with a portable transaction device, the method including providing transaction apparatus operative to participate in a monetary transaction, authorizing the transaction apparatus to operate based on stored authorization parameters, the stored authorization parameters including at least one of the following: an identity of a user, a time period, and a distance, and storing the stored authorization parameters based on user input.

There is also provided in accordance with still another preferred embodiment of the present invention a method for use with a portable element, the method including providing a portable element, authorizing use of the portable element in accordance with at least one of the following authorization parameters: at least one defined period of time, a defined distance from a specified location, at least one defined type of transaction, at least one type of transaction meeting a predefined criterion, and at least one authorized person authorized to use the portable element.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
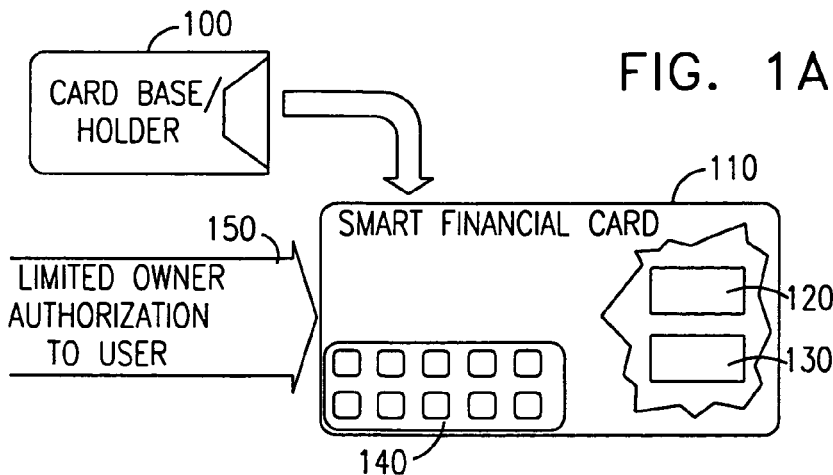
FIG. 1A is a simplified pictorial illustration of a system including a portable transaction device, the portable transaction device being constructed and operative in accordance with a preferred embodiment of the present invention.

Reference is now made to FIG. 1A which is a simplified pictorial illustration of a system including a portable transaction device, the portable transaction device being constructed and operative in accordance with a preferred embodiment of the present invention.

The term "transaction device", as used throughout the present specification and claims, includes any device which is used for carrying out a transaction, such as a transaction of any appropriate kind between two parties or a monetary transaction. Transaction devices, including transaction devices in the form of a smart card, are well known in the art. Such devices may include, for example, electronic cash cards such as Mondex® cards and similar cards, and electronic wallets of various kinds, which are well known in the art.

The system of FIG. 1A includes a card base/holder 100 and a smart financial card 110. The smart financial card 110 is shown as having been removed from the card base/holder 100. Preferably, the card base/holder 100 is formed to receive the smart financial card 110. It is appreciated that, alternatively, the card base/holder 110 may function as a base and not as a holder, and may be formed in any appropriate shape. Preferable functioning of the card base/holder 100 is described below.

The smart financial card 110 is shown as an example only of a portable transaction device in FIG. 1A for ease of description, it being appreciated that any other appropriate transaction device may be used. For example, and without limiting the generality of the foregoing, a transaction device not in the form of a card may be used. For example, as is well known from the field of electronic wallets, a transaction device may include an appropriately programmed personal computer, personal digital assistant, or cellular phone. It is appreciated that, in a preferred embodiment of the present invention, a transaction device preferably comprises a portable device, particularly a device that is easily carried from place to place.

The smart financial card 110 preferably comprises a processor 120 and a memory 130, as well as other conventional components (not shown), as are well known in the art of smart cards. The memory 130 preferably comprises a non-volatile memory, it being appreciated that the smart financial card 110 does not necessarily comprise an internal power supply, and in the absence of an internal power supply is preferably fed power from an external power supply during a transaction session, as is well known in the art of smart cards. Because the presence of a power supply can not be assured in all cases and at all times, non-volatile memory is generally preferred.

The processor 120 and the memory 130 are preferably operatively associated via appropriate bi-directional communications, as is well known in the art. A preferred implementation of the smart financial card 110, including a preferred implementation of the processor 120 and the memory 130, is described below with reference to FIG. 2.

The smart financial card 110 also comprises a input device 140. The input device 140 may comprise any appropriate input device or combination thereof. For example, and without limiting the generality of the foregoing, the input device 140 may comprise:

- a keyboard, which may comprise a full keyboard or a limited keyboard having a limited number of keys, such as 10 keys as shown by way of example in FIG. 1A;
- a voice input device, preferably including voice recognition hardware and software, as are well known in the art; and
- a biometric sensor, such as a fingerprint input and verification device, as is well known in the art.

One particular example of a keyboard input device, not intended to limit the generality of the foregoing, comprises a plurality of keys each indicating a particular denomination of money, period of time, and so forth. The label of each key may be either fixed or variable according to context, as is well known in the art. Furthermore, different types of input device may be combined such as, for example, a "keyboard" in which each of the plurality of input keys comprises a biometric sensor and input is accepted only upon biometric verification.

It is appreciated that a voice input device may be considered as a type of biometric sensor, although a voice input device is generally discussed herein separately from a biometric sensor for purposes of simplicity of description.

Biometric sensors generally are very well known in the art, and a person of the art would be able to choose one or more appropriate biometric sensors for use in the present invention.

The operation of the system of FIG. 1A is now briefly described. Preferably, the smart financial card 110 is removed from the card base/holder 100. It is appreciated that, alternatively, the card base/holder 100 and the smart financial card 110 may be designed to allow operation of the financial card 110 while the financial card 110 is inserted in the card base/holder 100. Further alternatively, it is appreciated that, in a case where the card base/holder 100 functions as a base only, the smart financial card 110 would not need to be "removed".

As further described below with reference to FIG. 2, owner information identifying an owner of the smart financial card 110 is preferably stored in the memory 130. Typically, only one person at a time may be identified as an owner of the smart financial card 110. Alternatively, more than one person may be identified as owner of the smart financial card 110 at one time; in such a case, one owner alone, all owners, a majority of all owners, or any other appropriate number of owners, acting together, may be understood as equivalent to "the owner" of the smart financial card 110.

It is appreciated that, wherever the owner of the smart financial card 110 is described herein as providing the owner's identity to the smart financial card 110 or as being identified by the smart financial card 110, any appropriate method of identification, as is well known in the art, may be used. Typically, identification comprises comparison of a supplied input with a stored value associated with the owner, the stored value preferably being stored in the memory 130. It is appreciated that, as is well known in the art, particularly in the art of password checking, the stored value may comprise a derived value, with comparison comprising comparison of a derived value of the supplied input against the stored derived value. For example, and without limiting the generality of the foregoing, the derived value of the supplied input, for example, may comprise any one or combination of the following: a hash of the supplied value; and a result of applying a one-way function to the supplied value. Appropriate hash functions are well known in the art and are described, for example, in Applied Cryptography, Second Edition, by Schneier, referred to above.

Appropriate apparatus and methods, well known in the art, for preventing illicit change of the stored value may preferably be employed. For example, and without limiting the generality of the foregoing, for the identification:

1. In a case where the input device 140 comprises a keyboard, identification may take place by entering a personal identification number (PIN) associated with the owner via the input device 140, identification comprising comparing the input PIN with the stored PIN of the owner, the stored PIN typically being stored in the memory 130.

2. In a case where the input device 140 comprises a voice input device, identification may take place by voice pattern recognition, as is well known in the art. Typically, the voice pattern recognition may be executed by an appropriate combination of software and hardware in the processor 120. It is appreciated that auxiliary special purpose hardware (not shown), as is well known in the art, may be used in conjunction with the processor 120.

3. In a case where the input device 140 comprises a biometric sensor, identification may take place by biometric identification, as is well known in the art. Typically, the biometric identification may be executed by an appropriate combination of software and hardware in the processor 120. It is appreciated that auxiliary special purpose hardware (not shown), as is well known in the art, may be used in conjunction with the processor 130. Without limiting the generality of the foregoing, the biometric sensor may, for example, comprise a fingerprint sensor.

The owner of the smart financial card 110 may intend to make use of the smart financial card 110. Preferably, in such a case, the owner provides the owner's identity to the smart financial card 110, and only upon successful identification of the owner and verification that the owner is the authorized owner, as described above, the processor 120 is preferably operative to process a financial transaction.

Alternatively, as shown in FIG. 1A, preferably upon command by the owner and upon successful identification of the owner and verification that the owner is the authorized owner, as described above, the smart financial card 110 is operative to receive a limited owner authorization 150 to another person to become a user of the smart financial card 110. Preferably, an identification of the newly authorized user is entered via the input device 140 and stored in the memory 130. Preferably, the limited owner authorization 150 comprises one or more limits, in addition to a limit to a particular user. It is appreciated that more than one user may be given authorization, either as part of one limited owner authorization 150 or by a plurality of limited owner authorizations 150, directed to more than one user. The one or more limits may include any appropriate limit; for example, the one or more limits may include any of the following:

1. A limit on location of use of the smart financial card 110, typically comprising a limit forbidding, modifying, or otherwise restricting use of the smart financial card 110 beyond a predefined distance from the card base/holder 100. In such a case appropriate proximity determination apparatus (not shown in FIG. 1A) is preferably comprised in the smart financial card 110, with appropriate complementary apparatus being comprised in the card base/holder 100. It is appreciated that proximity determination apparatus is well known in the art, and that any appropriate proximity determination apparatus may be used. Preferably, predefined distance information defining the predefined distance is stored, in such a case, in the memory 130. A preferred implementation of proximity determination apparatus is described in more detail below with reference to FIG. 2.

2. A time limit on use of the smart financial card 110, typically comprising a maximum elapsed time from a time of authorization, beyond which the smart financial card 110 is not authorized for use. Alternatively, the time limit may comprise a fixed time. In such a case appropriate time determination apparatus (not shown), such as an accurate clock, as is well known in the art, is preferably comprised in the smart financial card 100. Preferably, predefined time information defining the time limit is stored, in such a case, in the memory 130.

Reference is now additionally made to FIGS. 1B–1E, which are simplified pictorial illustrations of the system of FIG. 1A, useful in understanding the operation thereof.

Figure 1B:
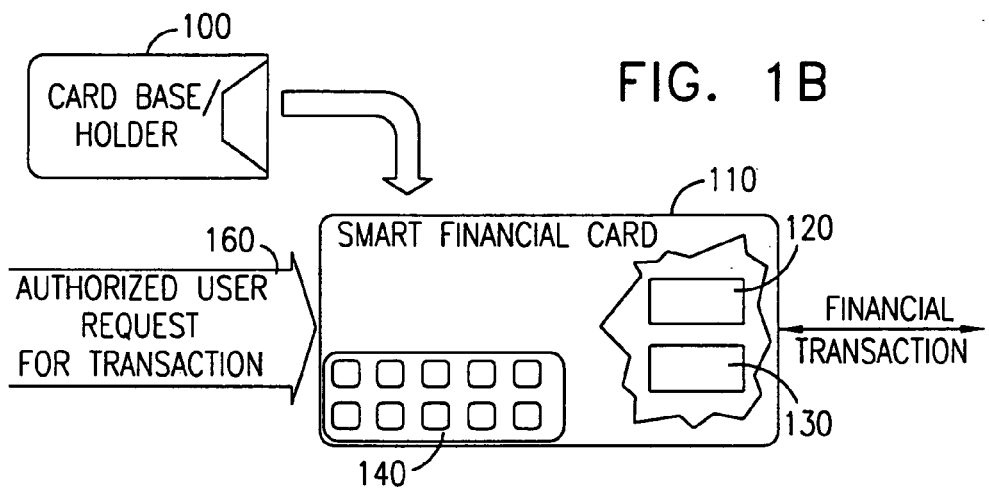
FIGS. 1B–1E are simplified pictorial illustrations of the system of FIG. 1A, useful in understanding the operation thereof.

In FIG. 1B an authorized user request for transaction 160 is received, the authorized user request 160 preferably comprising a request by a user authorized by the owner, as described above with reference to FIG. 1A. The smart financial card 110 of FIG. 1B preferably participates in a financial transaction based, at least in part, on the request by the authorized user.

Figure 1C:
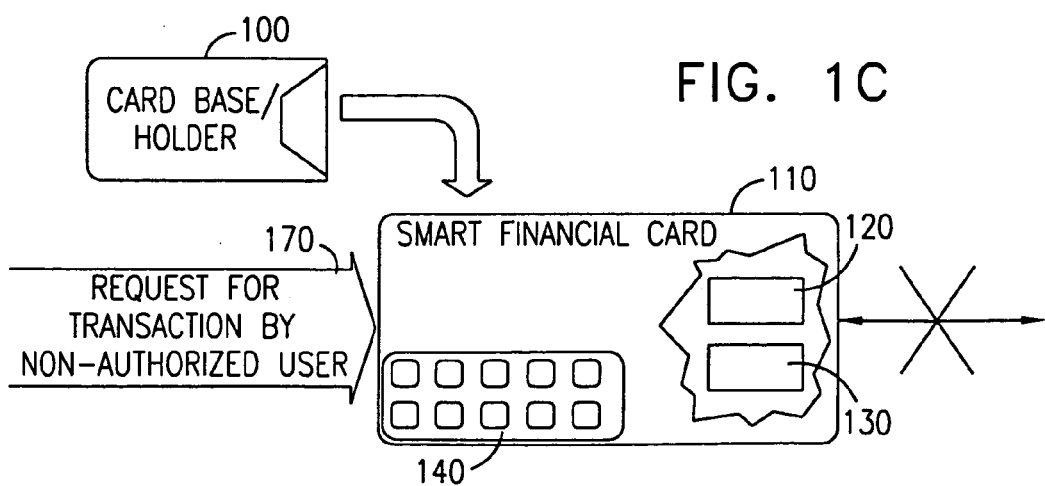

In FIG. 1C a non-authorized user request for transaction 170 is received, the non-authorized user request 170 typically comprising a request by user who is not authorized by the owner, as described above with reference to FIG. 1A. The smart financial card 110 of FIG. 1C preferably declines to participate in a financial transaction as requested by the non-authorized user.

Figure 1D:
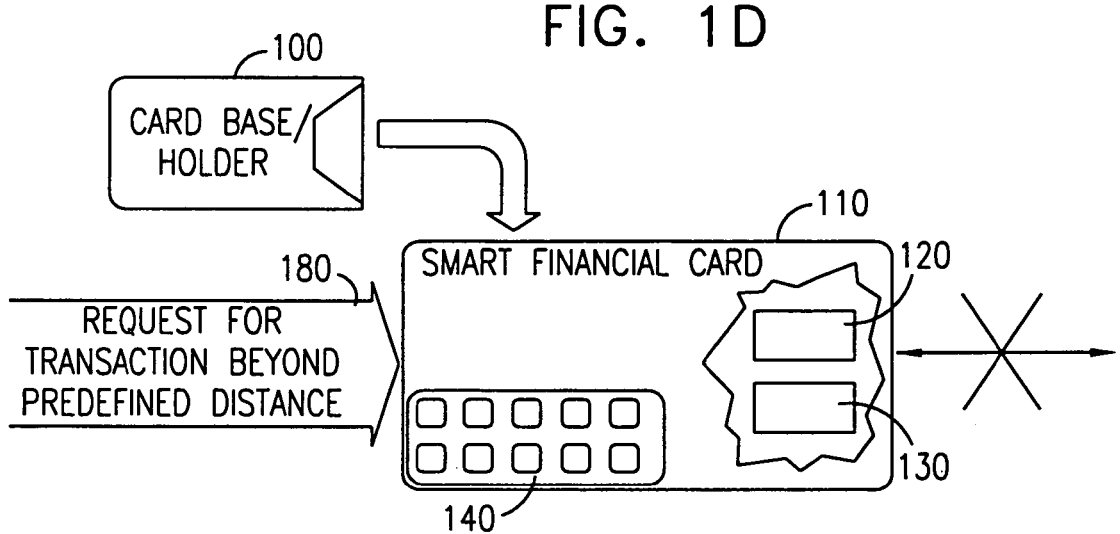

In FIG. 1D a user, typically but not necessarily comprising an authorized user, enters a distant request 180 for a transaction, the smart financial card 110 being more than a predetermined distance from the card base/holder 100, as described above with reference to FIG. 1A. The smart financial card 110 of FIG. 1D preferably declines to participate in a financial transaction as requested, when beyond the predetermined distance from the card base/holder 100.

In one preferred embodiment of the present invention, once a financial transaction is requested via a distant request 180, participation in future financial transactions are also declined, preferably until a predefined event such as a re-authorization (not shown) by the owner. In an alternative preferred embodiment of the present invention, participation in future financial transactions is determined on an individual basis for each financial transaction such that, for example, a later authorized request such as the authorized user request 160 of FIG. 1B will result in the smart financial card 110 participating in a transaction.

Figure 1E:
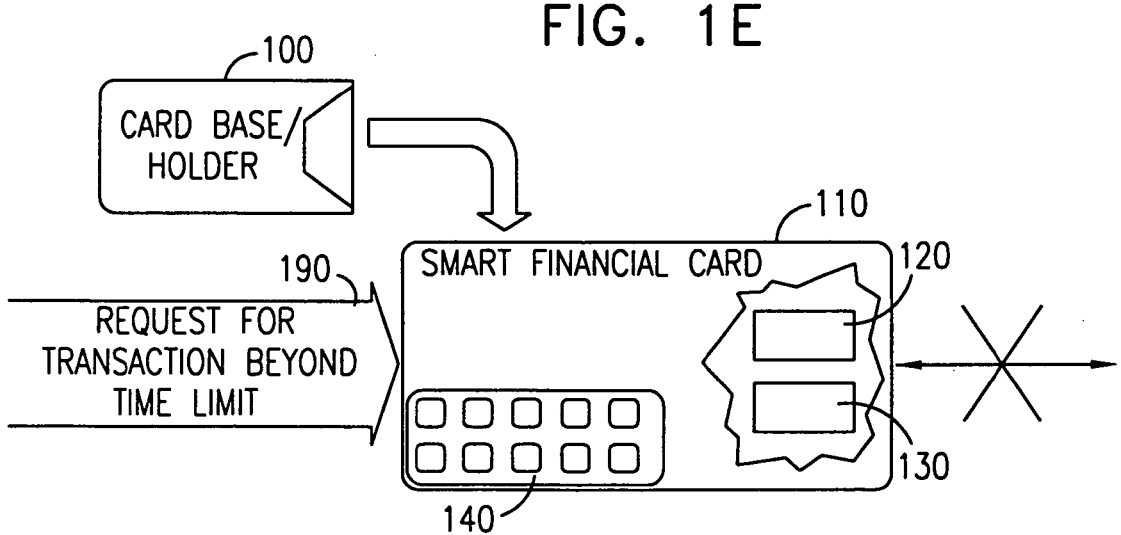

In FIG. 1E a request for transaction beyond a time limit 190 is received by the smart financial card 110. The smart financial card 110 of FIG. 1E preferably declines to participate in a financial transaction as requested, after a predetermined time as specified above.

It is appreciated that any appropriate combination of factors described above, particularly with reference to FIGS. 1A–1E, may be used by the smart financial card 110 to determine whether or not to participate in or otherwise allow a transaction. For example, and without limiting the generality of the foregoing, a function might be defined to determine a spending limit. One particular example of such a function, provided as a particularly detailed example only, might comprise the following:

$$\text{spending limit in dollars} = (100)/(\text{elapsed time in minutes})^2$$

It will be appreciated that the example function would greatly lower the spending limit as the time since the spending was authorized increases; such an approach might be desirable when the owner of the smart financial card 110 expected the authorized user to use the card quickly. Should the card go astray or not be returned, the value of the card when used in a transaction would quickly decline.

It is appreciated that a skilled person of the art would understand other factors, similar to those mentioned above, to be included in the scope of the present invention even if not explicitly enumerated herein.

It is further appreciated that the smart financial card 110 may include an output unit (not shown) which may be operative to provide appropriate output to a user of the smart financial card 110. Without limiting the generality of the foregoing, the output of the output unit (not shown) may comprise one or more of the following: a name of the owner or of one or more authorized users; a listing of limits imposed on transactions, such as the factors described above for limiting transactions; records of transactions; and records of attempted transactions in which the smart financial card 110 declined to participate. It is appreciated, as is well known in the art, that an appropriate output unit (not shown) may comprise an LCD display or a similar display, a voice output device, or any similar output device.

Figure 2:
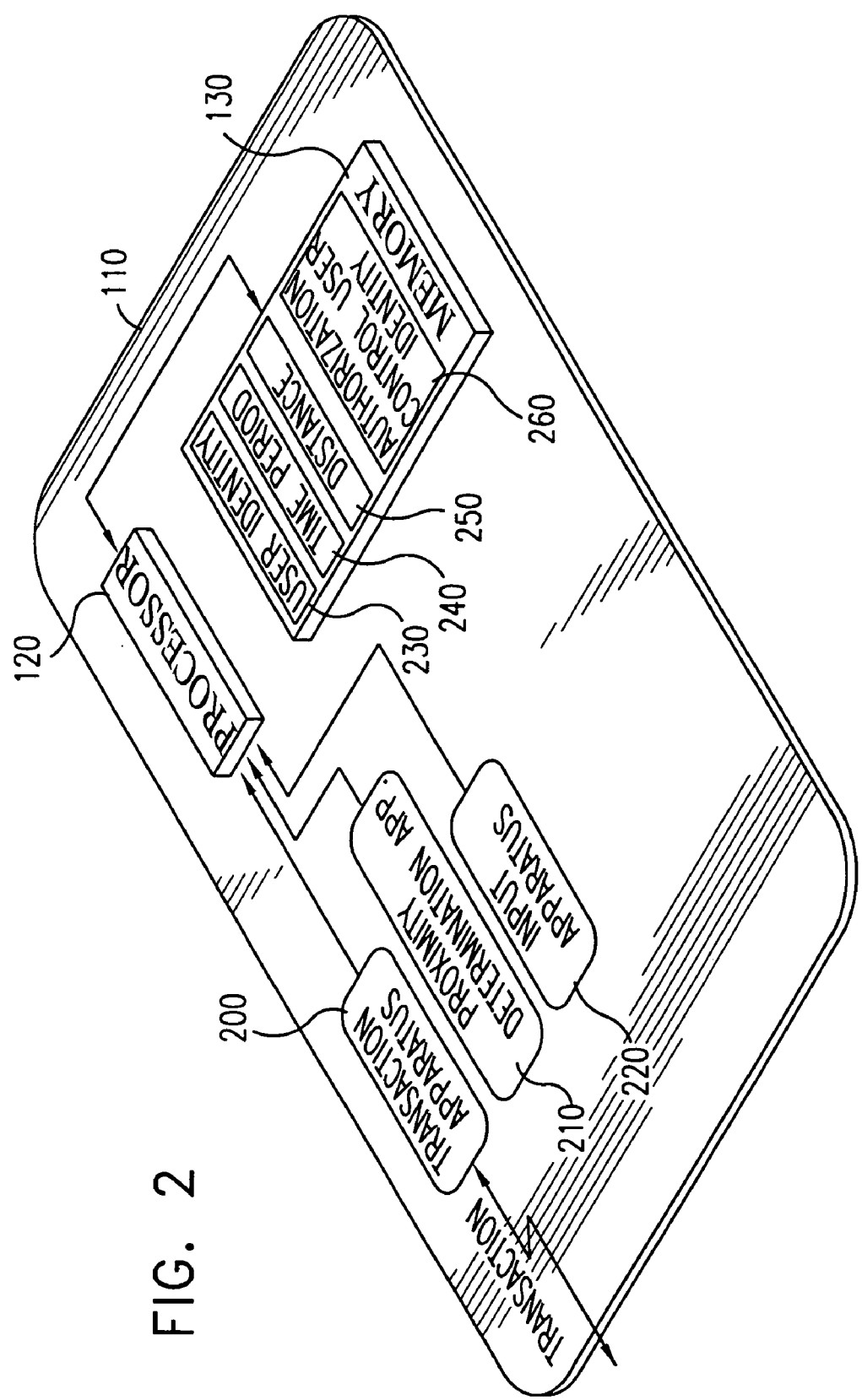
FIG. 2 is a simplified partly pictorial, partly block diagram illustration of a preferred implementation of the portable transaction device of FIG. 1A.

Reference is now made to FIG. 2, which is a simplified partly pictorial, partly block diagram illustration of a preferred implementation of the portable transaction device of FIG. 1A. The apparatus of FIG. 2 comprises one particular preferred implementation of the smart financial card 110 of FIGS. 1A–1E; it is appreciated that many other implementations are possible.

The smart financial card 110 of FIG. 2 comprises the following elements:

a processor 120, which may comprise any appropriate general purpose or special purpose processor, preferably a processor comprising a real-time clock or an interval clock; the other elements of the smart financial card 110, described below, are each preferably in operative association with the processor 120 via appropriate conventional communication means;

a memory 130, which may comprise any appropriate memory;

transaction apparatus 200, which may comprise any appropriate apparatus, as is well known in the art, for carrying out transactions such as financial transactions with external devices; preferably, the transaction apparatus 200 includes communication apparatus appropriate for communicating with external devices;

proximity determination apparatus 210, which may comprise any appropriated proximity determination apparatus such as, for example, radio frequency based proximity determination apparatus or ultrasound based proximity determination apparatus. The proximity determination apparatus may operate on any appropriate principle known in the art. For example, a radio frequency or ultrasound based proximity apparatus may operate by estimating distance from the card base/holder 100 of FIG. 1 based on strength of a low-power radio frequency signal or ultrasound signal received; a radio frequency or ultrasound based proximity apparatus may be preferred due to relatively low cost. A more precise apparatus may be based on broadcast from the card base/holder 100 of a radio signal comprising an extremely accurate time signal, such as an atomic clock based time signal, with a corresponding proximity determination apparatus comprising an appropriate receiver and also comprising an extremely accurate time signal, with distance from the card base/holder 100 being determined based on the speed of light; the more precise apparatus, while theoretically preferably, may be difficult and expensive to implement; and input apparatus 220, which may comprises an input device such as a keyboard, as described above, or biometric/voice recognition apparatus as described above, together with appropriate interface and analysis units.

The memory 130 preferably comprises the following subunits:

a user identity unit 230, preferably operative to store user identity information as described above;

a time period unit 240, preferably operative to store time period information related to authorization determinations, as described above;

a distance unit 250, preferably operative to store maximum distance information related to authorization determinations, as described above; and an authorization control user identity unit 260, preferably operative to store information about the authorization control user, as described above.

It is appreciated that the memory 130 is also preferably operative to store other information related to authorization determinations. For example, and without limiting the generality of the foregoing, the memory 130 may be operative to store information defining a function defining a spending limit, as described above, or to store any other appropriate information.

It is appreciated that at least some of the elements of the smart financial card 110 of FIG. 2 are shown functionally, and that an appropriate hardware implementation of the smart financial card 110 may comprises more or fewer physical elements than the number of functional elements which are shown, the physical elements implementing the functional elements in appropriate combination, as will be appreciated by a person skilled in the art.

It is appreciated that the smart financial card 110 and the elements comprised therein are preferably equipped with appropriate anti-tamper features, as is well known in the art.

Figure 3A:
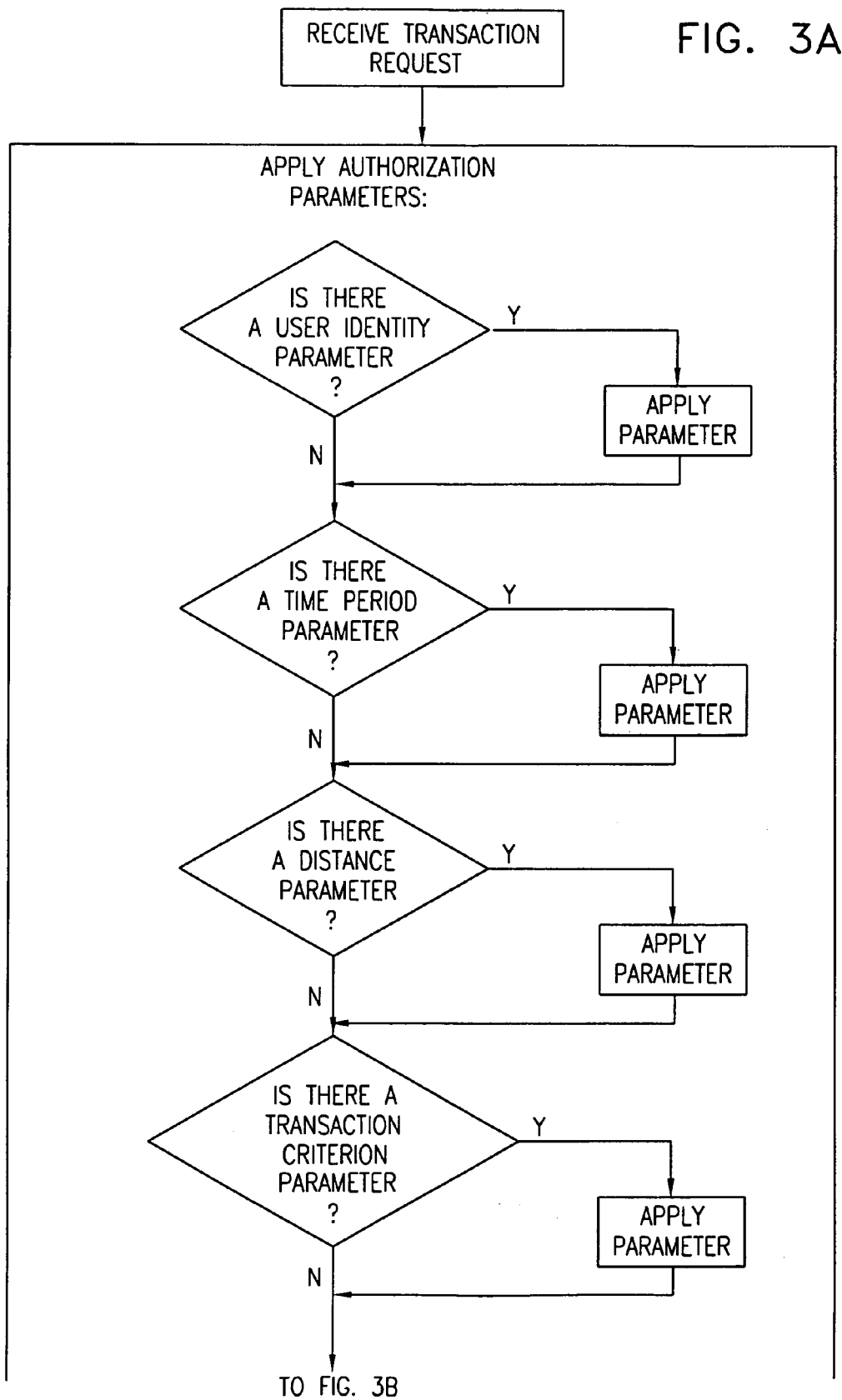
FIGS. 3A and 3B taken together comprise a simplified flowchart illustration of a preferred method of operation of the apparatus of FIGS. 1A–1E.
Figure 3B:
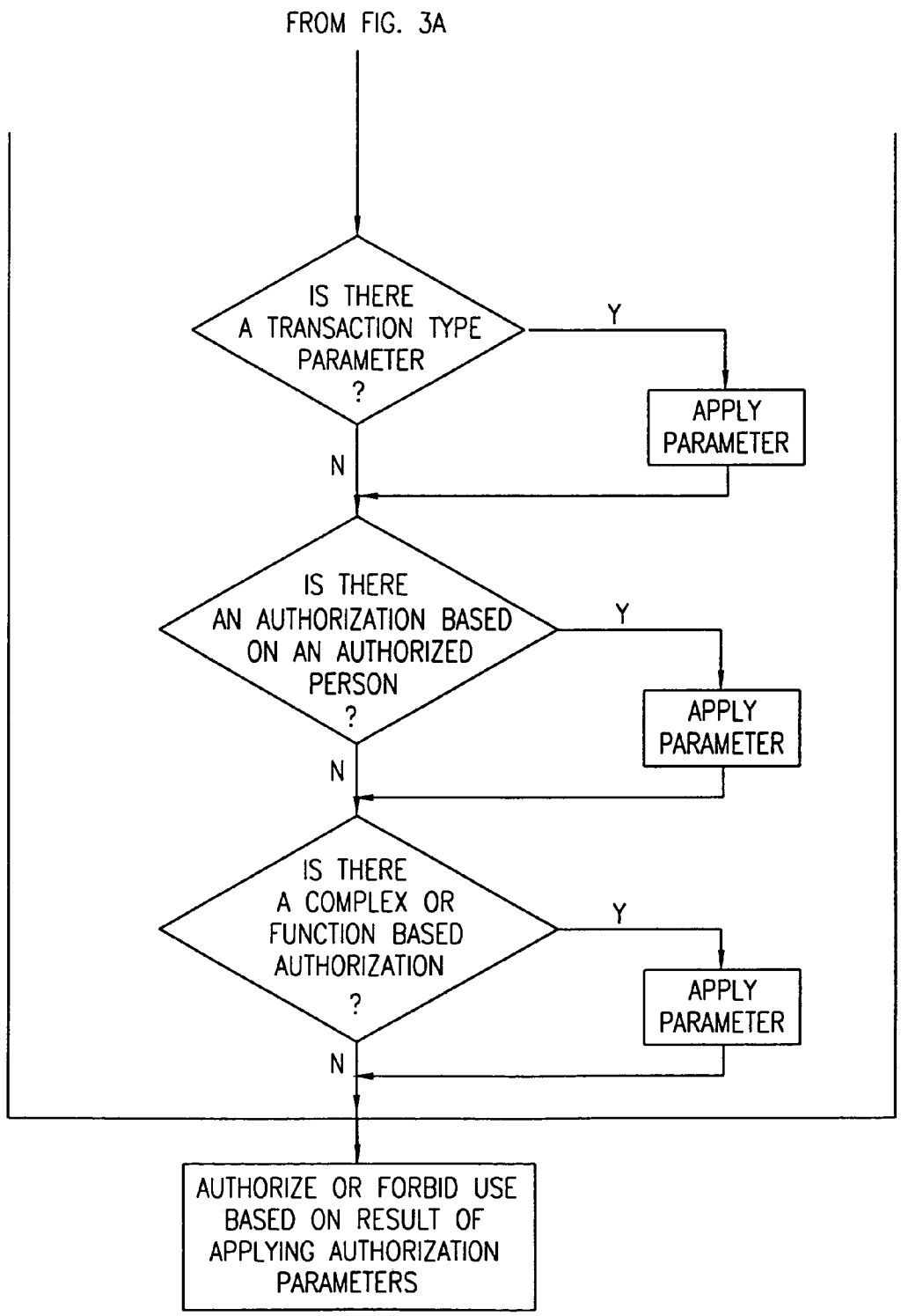

Reference is now made to FIGS. 3A and 3B, which, taken together, comprise a simplified flowchart illustration of a preferred method of operation of the apparatus of FIGS. 1A–1E. The method of FIGS. 3A and 3B is self-explanatory with reference to the above description of FIGS. 1A–1E and 2.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A portable element comprising:

a proximity determination device operative to determine a distance of the portable element from a specified location and to produce a signal indicative of the distance; and a processor comprising a clock, the processor receiving the signal and being operative to authorize use of the portable element in accordance with at least one of the following authorization parameters:

at least one defined period of time; and said distance from said specified location, wherein the processor is operative to authorize use of the portable element up to a quantitative use limit, and the use limit varies between a maximum use limit and a minimum use limit and includes a range of non-zero use limits determined as a monotonically decreasing function of at least one of the following:

an elapsed time since said defined period of time; and the distance indicated by the signal.

2. A portable element according to claim 1 and wherein the processor is operative to authorize use of the portable element in accordance with a predefined function of at least two of the authorization parameters.

3. A portable element according to claim 1 and wherein the portable element comprises a control device for controlling electronic equipment.

4. A portable element according to claim 3 and wherein the control device comprises a television remote control device.

5. A portable element according to claim 1 and wherein the authorization parameters are based, at least in part, on authorization parameter defining information, and also comprising:

authorization input apparatus operative to receive the authorization parameter defining information.

6. A portable element according to claim 5 and wherein the authorization input apparatus comprises input authentication apparatus operative to authenticate the received authorization parameter defining information and to reject non-authentic received information.

7. A portable element according to claim 1 and wherein the monotonically decreasing function comprises a non-linear function.

8. A portable element according to claim 7 and wherein the non-linear function comprises an inverse-square function.

9. A portable device comprising:

an input device operative to receive a user-identifying input and at least one user selectable use limitation from a user of the portable device;

a control user identity unit operative to store information identifying a control user;

user determination apparatus operative to determine whether the user is an authentic control user based, at least in part, on the user-identifying input and on the information stored in the control user identity unit;

proximity determination apparatus operative to determine a distance of the portable element from a specified location and to produce a signal indicative of the distance; and a processor comprising a clock, the processor receiving the signal and being operative to limit use of the portable device in accordance with the at least one user selectable use limitation if the user is determined to be an authentic control user by the user determination apparatus, wherein the use limitation comprises at least one of the following:

at least one defined period of time;

said distance from said specified location, and the processor is operative to limit use of the portable device up to a quantitative use limit, and the use limit varies between a maximum use limit and a minimum use limit and includes a range of non-zero use limits determined as a monotonically decreasing function of at least one of the following:

an elapsed time since said defined period of time; and the distance indicated by the signal.

10. A portable device according to claim 9 and wherein the portable device comprises a control device for controlling electronic equipment, and the control device comprises a television remote control device.

11. A portable device according to claim 9 and wherein the input device comprises a keyboard.

12. A portable device according to claim 9 and wherein the input device comprises a voice input device.

13. A portable device according to claim 9 and wherein the input device comprises a biometric sensor.

14. A portable device according to claim 9 and wherein the monotonically decreasing function comprises a non-linear function.

15. A portable device according to claim 14 and wherein the non-linear function comprises an inverse-square function.

* * * * *